(12) United States Patent
Freeland

(10) Patent No.: US 6,656,324 B2
(45) Date of Patent: Dec. 2, 2003

(54) METHOD FOR REMOVING WAX FROM A PULP FURNISH

(75) Inventor: Susan A. Freeland, Covington, WA (US)

(73) Assignee: Weyerhaeuser Company, Federal Way, WA (US)

(*) Notice: Subject to any disclaimer, the term of this patent is extended or adjusted under 35 U.S.C. 154(b) by 0 days.

(21) Appl. No.: 10/076,871

(22) Filed: Feb. 14, 2002

(65) Prior Publication Data
US 2002/0148573 A1 Oct. 17, 2002

Related U.S. Application Data

(63) Continuation of application No. 09/637,446, filed on Aug. 11, 2000, now abandoned, which is a continuation of application No. PCT/US99/03914, filed on Feb. 23, 1999.
(60) Provisional application No. 60/075,808, filed on Feb. 24, 1998.

(51) Int. Cl.[7] ................................................. D21C 9/08
(52) U.S. Cl. ............................... 162/5; 162/8; 162/9
(58) Field of Search .............................. 162/4, 5, 6, 7, 162/8, 9, 199

(56) References Cited

U.S. PATENT DOCUMENTS

| | | | |
|---|---|---|---|
| 2,959,213 A | | 11/1960 | Savage |
| 4,533,487 A | * | 8/1985 | Jones .................... 510/405 |
| 5,213,661 A | | 5/1993 | Naddeo et al. |
| 5,441,601 A | | 8/1995 | Cosper et al. |
| 5,936,024 A | | 8/1999 | Ling et al. |

OTHER PUBLICATIONS

McEwen, J.G.E. and Baoyu Wang, "Improving the Repulpability of Wax Coated Corrugated Paperboard," *Tappi Journal* 76(7): 116–121, Jul. 1993.

* cited by examiner

Primary Examiner—Steven P. Griffin
Assistant Examiner—Carlos Lopez
(74) Attorney, Agent, or Firm—Christensen O'Connor Johnson Kindness PLLC

(57) ABSTRACT

A method for removing wax from a pulp furnish is disclosed. The method is effective for removing wax from a pulp furnish containing waxed old corrugated containers (OCC). In the method, the pulp furnish containing waxed OCC is treated with an agglomeration chemical which separates wax from the fibers and agglomerates the wax for removal by screening. In a preferred embodiment, the pulp furnish is treated with a caustic material to enhance wax removal.

17 Claims, 15 Drawing Sheets

FIGURE 2

| Set # | Chemicals Used | Whole Pulp Visual Appearance Ranked 1-5 Worst to Best | VFS Rejects % | Ranked by Rejects 1-10 Worst to Best | Accepted Wax Extraction % | Total Pulp Wax Extraction % |
|---|---|---|---|---|---|---|
| 10% Std | Raw Material not pulped | | | | | 3.01 |
| SAF41-1 | No Chemicals Added | 3 | 4.8 | 8 | 1.23 | 0.65 |
| SAF41-2 | 2% NaOH (Caustic) | 4 | 2 | 9 | 1.26 | 1.03 |
| SAF41-15 | 2% NaOH and Triton X-100 | 4 | 22.0 | 4 | 3.15 | 2.55 |
| SAF41-16 | 2% NaOH and Calcium Chloride | 5 | 13.7 | 6 | 2.86 | 3.13 |
| SAF41-18 | 2% NaOH and Alum | 3 | 16.5 | 5 | 2.02 | 3.13 |
| SAF41-19 | 2% NaOH and Potassium Sulfate | 4 | 1.0 | 10 | 1.1 | 3.14 |
| SAF41-20 | 2% NaOH and Sodium Borate | 5 | 7.5 | 7 | 3.15 | 2.59 |
| SAF41-21 | 2% NaOH, then acid to pH 5.5 | 1 | 29.6 | 2 | 1.59 | 4.01 |
| SAF41-22 | 2% NaOH and GCC | 1 | 22.8 | 4 | 2.59 | 2.96 |
| SAF41-23 | 2% NaOH and Cytec 3523 | 5 | 4.9 | 8 | 0.94 | 3.11 |
| SAF41-26 | 2% NaOH and 1 - Octanol | 2 | 9.6 | 7 | 1.56 | 3.43 |
| SAF41-27 | 2% NaOH and 2 - Propanol | 4 | 17.8 | 5 | 0.97 | 2.84 |
| SAF41-28 | 2% NaOH and Benzyl Alcohol | 4 | 12.0 | 7 | 1.81 | 2.86 |
| SAF41-29 | 2% NaOH and Steric Acid | 2 | 13.4 | 6 | 2.04 | 3.32 |
| SAF41-30 | 2% NaOH and Mineral Oil | 3 | 14.3 | 6 | 2.23 | 3.11 |
| SAF41-31 | 2% NaOH and BPP | 2 | 14.3 | 6 | 2.59 | 3.07 |
| SAF41-32 | 2% NaOH and WPP-8 | 2 | 25.3 | 3 | 2.31 | 3.25 |
| SAF41-33 | 2% NaOH and non disp. PCC | 4 | 30.9 | 2 | 2.45 | 3.32 |
| SAF41-34 | 2% NaOH and temp drop to 18C | 1 | 52.9 | 1 | 3.03 | 2.82 |
| SAF41-35 | 2% NaOH and Citric Acid | 3 | 10.6 | 7 | 1.58 | 2.26 |
| SAF41-36 | 2% NaOH and Lauryl Sulfate | 3 | 1 | 10 | 1.92 | 3.74 |
| SAF41-37 | 2% NaOH and Spic & Span | 3 | 3.9 | 8 | 2.79 | 3.04 |
| SAF41-38 | 2% NaOH and Murphys Oil Soap | 2 | 2.7 | 9 | 1.89 | 2.72 |
| SAF41-39 | 2% NaOH and Daraclean 2376 | 2 | 12.6 | 7 | 2.18 | 3.53 |
| SAF41-40 | 2% NaOH and Sodium Metasilicate | 4 | 0.9 | 10 | 2.21 | 3.20 |
| SAF41-41 | 2% NaOH and Sodium aluminosilicate | 1 | 10.3 | 7 | 2.23 | 3.40 |
| SAF41-42 | 2% NaOH and Simple Green | 2 | 1.3 | 10 | 2.22 | 3.04 |

FIGURE 4

| Sample ID | Description | Basis Weight lb/MSF | Caliper points |
|---|---|---|---|
| SAF42-1 | Control | 26.98 | 10.0 |
| SAF42-2 | 2% NaOH | 27.48 | 9.3 |
| SAF42-3 | 2%NaOH and potassium sulfate before pulping | 27.25 | 9.2 |
| SAF42-4 | 2%NaOH and potassium sulfate after pulping | 27.93 | 9.6 |
| SAF42-5 | 2%NaOH and Cytec 3523 before pulping | 25.89 | 9.3 |
| SAF42-6 | 2%NaOH and Lauryl sulfate before pulping | 25.73 | 9.0 |
| SAF42-7 | 2%NaOH and 2-propanol after pulping | 28.29 | 9.7 |
| SAF42-8 | 2%NaOH and Lauryl sulfate before and 2-propanol after pulping | 26.58 | 9.1 |
| SAF42-9 | 2%NaOH and potassium sulfate before and citric acid after pulping | 26.44 | 9.1 |
| SAF42-10 | 2%NaOH and citric acid after pulping | 29.54 | 10.1 |
| SAF42-11 | 2%NaOH and Murphys oil soap and Cytec 3523 both before pulping | 25.79 | 9.1 |
| SAF42-12 | 2%NaOH and lauryl sulfate before and potassium sulfate after | 26.09 | 9.3 |
| SAF 42-13 | 2% NaOH and sodium metasilicate before pulping | 26.03 | 9.1 |
| SAF 42-14 | 2% NaOH and simple green before pulping | 27.44 | 9.6 |
| SAF 42-15 | 2% NaOH and sodium metasilicate before and potassium sulfate after | 27.08 | 9.1 |
| SAF 42-16 | 2% NaOH and potassium sulfate before and 2 - propanol after | 26.48 | 9.0 |
| SAF 42-17 | 2% NaOH and sodium sulfate before pulping | 27.32 | 9.5 |
| SAF 42-18 | 2% NaOH and d-Limonene before pulping | 26.93 | 9.5 |
| SAF 42-19 | 2% NaOHand sodium metasilicate (5#/ton)and Daraclean 2376(1#/ton | 27.32 | 9.5 |
| SAF 42-20 | 2% NaOH and sodium lignosulfonate before pulping | 27.48 | 9.5 |
| SAF 42-21 | 2% NaOH and terpineol before pulping | 25.79 | 8.8 |
| SAF 42-22 | Potassium sulfate before pulping | 26.94 | 9.6 |
| SAF 42-23 | Potassium sulfate after pulping | 25.36 | 9.8 |
| SAF 42-24 | Sodium metasilicate | 26.15 | 9.4 |
| SAF 42-25 | Simple Green | 26.64 | 9.7 |
| SAF 42-26 | 2% NaOH and poly aluminum chloride before pulping | 26.66 | 9.6 |
| SAF 42-27 | NaOH to pH 8 - 8.5 | 26.39 | 9.7 |
| SAF 42-28 | NaOH to pH 8 - 8.5 and potassium sulfate | 26.47 | 9.9 |

FIGURE 5

| Sample ID | Density lb/ft^3 | SSC Lbs/in | SSC Index | Sheet Moisture % | CSF | VFS Rejects % |
|---|---|---|---|---|---|---|
| SAF42-1 | 32.38 | 11.98 | 0.44 | 8.09 | 670 | 7.6 |
| SAF42-2 | 35.46 | 16.71 | 0.61 | 8.15 | 630 | 0.7 |
| SAF42-3 | 35.54 | 17.05 | 0.63 | 8.19 | 630 | 0.8 |
| SAF42-4 | 34.91 | 16.89 | 0.60 | 8.26 | 630 | 0.6 |
| SAF42-5 | 33.41 | 13.52 | 0.52 | 8.27 | 670 | 1.5 |
| SAF42-6 | 34.31 | 14.97 | 0.58 | 8.21 | 630 | 0.9 |
| SAF42-7 | 35.00 | 16.27 | 0.57 | 8.10 | 630 | 0.7 |
| SAF42-8 | 35.05 | 15.52 | 0.58 | 8.17 | 640 | 0.6 |
| SAF42-9 | 34.87 | 14.71 | 0.56 | 8.19 | 650 | 0.7 |
| SAF42-10 | 35.10 | 16.83 | 0.57 | 8.17 | 650 | 0.5 |
| SAF42-11 | 34.01 | 14.68 | 0.57 | 8.23 | 640 | 0.8 |
| SAF42-12 | 33.66 | 15.63 | 0.60 | 8.27 | 600 | 0.5 |
| SAF 42-13 | 34.33 | 14.74 | 0.57 | 7.90 | 660 | 0.8 |
| SAF 42-14 | 34.30 | 14.85 | 0.54 | 7.80 | 670 | 0.6 |
| SAF 42-15 | 35.71 | 15.25 | 0.56 | 7.91 | 670 | 0.6 |
| SAF 42-16 | 35.31 | 14.84 | 0.56 | 7.93 | 670 | 0.6 |
| SAF 42-17 | 34.51 | 15.32 | 0.56 | 7.88 | 670 | 0.7 |
| SAF 42-18 | 34.02 | 15.26 | 0.57 | 7.87 | 610 | 0.6 |
| SAF 42-19 | 34.51 | 13.47 | 0.49 | 7.79 | 650 | 0.6 |
| SAF 42-20 | 34.71 | 15.37 | 0.56 | 7.97 | 650 | 0.5 |
| SAF 42-21 | 35.17 | 14.56 | 0.56 | 7.86 | 670 | 0.6 |
| SAF 42-22 | 33.68 | 11.40 | 0.42 | 7.96 | 680 | 4.4 |
| SAF 42-23 | 31.05 | 9.36 | 0.37 | 7.90 | 680 | 4.4 |
| SAF 42-24 | 33.38 | 11.86 | 0.45 | 7.87 | 680 | 3.7 |
| SAF 42-25 | 32.96 | 10.64 | 0.40 | 7.69 | 670 | 5.0 |
| SAF 42-26 | 33.33 | 15.14 | 0.57 | 7.76 | 620 | 0.5 |
| SAF 42-27 | 32.65 | 11.20 | 0.42 | 7.81 | 700 | 4.8 |
| SAF 42-28 | 32.08 | 10.62 | 0.40 | 7.79 | 690 | 4.3 |

FIGURE 6

| Sample ID | Accepted Wax Extraction % | Total Pulp Wax Extraction % | Wax Lost | Conductivity uS | pH before pulping | Surface Tension Before Pulping |
|---|---|---|---|---|---|---|
| SAF42-1 | 1.51 | 3.46 | 1.95 | 2600 | 6.16 | 59.8 |
| SAF42-2 | 1.19 | 1.22 | 0.03 | 1519 | 11.6 | 50.47 |
| SAF42-3 | 0.77 | 1.81 | 1.04 | 400 | 11.62 | 61.53 |
| SAF42-4 | 0.73 | 0.97 | 0.24 | 1334 | 11.57 | 56.87 |
| SAF42-5 | 0.77 | 2.37 | 1.6 | 1770 | 12.2 | 54.37 |
| SAF42-6 | 1.26 | 0.49 | -0.77 | 1516 | 11.4 | 63.63 |
| SAF42-7 | 1.15 | 1.89 | 0.74 | 814 | 11.72 | 55.53 |
| SAF42-8 | 0.76 | 2.51 | 1.75 | 100 | 11.63 | 58.6 |
| SAF42-9 | 1.12 | 2.56 | 1.44 | 1530 | 11.3 | 60 |
| SAF42-10 | 1.05 | 2.44 | 1.39 | 1113 | 11.14 | 55.6 |
| SAF42-11 | 0.80 | 1.58 | 0.78 | 1578 | 11.77 | 54.27 |
| SAF42-12 | 0.79 | 1.83 | 1.04 | 1458 | 11.64 | 56.07 |
| SAF 42-13 | 1.21 | 2.31 | 1.1 | 2710 | 12.38 | 52.23 |
| SAF 42-14 | 1.31 | 1.82 | 0.51 | 2270 | 11.51 | 54.63 |
| SAF 42-15 | 0.98 | 2.98 | 2 | 2630 | 12.2 | 53.83 |
| SAF 42-16 | 0.79 | 2.44 | 1.65 | 2430 | 12.21 | 55.23 |
| SAF 42-17 | 0.76 | 2.72 | 1.96 | 2190 | 12.32 | 51.7 |
| SAF 42-18 | 0.93 | 2.74 | 1.81 | 2490 | 11.67 | 65.13 |
| SAF 42-19 | 0.57 | 1.68 | 1.11 | 430 | 9.38 | 53.87 |
| SAF 42-20 | 1.14 | 2.23 | 1.09 | 2410 | 12.05 | 53.9 |
| SAF 42-21 | 0.79 | 2.52 | 1.73 | 2270 | 12.33 | 64.27 |
| SAF 42-22 | 1.52 | 2.42 | 0.9 | 468 | 7.09 | 64.2 |
| SAF 42-23 | 1.81 | 2.38 | 0.57 | 266 | 6.47 | 66 |
| SAF 42-24 | 1.64 | 2.64 | 1 | 500 | 9.78 | 65 |
| SAF 42-25 | 0.59 | 2.49 | 1.9 | 357 | 7.82 | 57.4 |
| SAF 42-26 | 0.94 | 2.64 | 1.7 | 1730 | 11.15 | 65.47 |
| SAF 42-27 | 1.58 | 3.33 | 1.75 | 357 | 8.47 | 63.63 |
| SAF 42-28 | 1.58 | 2.67 | 1.09 | 623 | 8.24 | 63.63 |

METHOD FOR REMOVING WAX FROM A PULP FURNISH

CROSS-REFERENCE TO RELATED APPLICATIONS

This application is a continuation of prior U.S. patent application Ser. No. 09/637,446, filed Aug. 11, 2000, now abandoned, which is a continuation of International Patent Application No. PCT/US99/03914, filed Feb. 23, 1999, which claims the benefit of U.S. Provisional Patent Application No. 60/075,808, filed Feb. 24, 1998, priority of the filing dates of which is hereby claimed under 35 U.S.C. §§120 and 119, respectively.

FIELD OF THE INVENTION

The present invention relates to a method for removing wax from a pulp furnish and, more particularly, a method from removing wax from a pulp furnish containing waxed old corrugated containers.

BACKGROUND OF THE INVENTION

Today many paper mills are utilizing recycled fiber as a portion of their papermaking furnish. Recycled fiber is a valuable raw material, though it is inherently weaker than virgin fiber and contains contaminants which effect system cleanliness and appearance. Many new chemistry technologies are emerging to improve the appearance and strength of recycled fiber containing furnishes, as well as improving system cleanliness. Raw materials of reduced cost and quality such as waxed old corrugated containers (wOCC), mixed office waste (MOW), and curbside mixed waste (CMW) may be utilized without loss in appearance and paper properties when chemical aids to pulp cleaning are incorporated. Replacement of 10% of the OCC with wax saturated OCC would represent a significant economic savings for the paper mill.

SUMMARY OF THE INVENTION

The present invention provides a method for removing wax from a pulp furnish. More specifically, a method for recycling waxed old corrugated containers (wOCC) is provided. In the method, waxed OCC is first separated into fibers and wax, and then the wax is separated from the fibers. The separation of wax from the fibers is effected through the utilization of agglomerization chemicals. The method of the invention provides fibers from waxed OCC that preferably include less than about 0.5% by weight wax.

Through the method of the invention, waxed OCC can be recycled and used in a conventional pulping operation. A pulper furnish containing 10% wax saturated boxes has 95% yield through the operation. The wax content of pulp produced by the method meets the levels commonly accepted by the papermaking industry.

In the method, agglomeration chemicals effectively increase the size of the wax particles removed from the fibers. The size increase facilitates their removal in the screening and cleaning stages in the mill. The chemicals that provide wax removal and agglomeration include sodium sulfate, potassium sulfate, d-limonene, sodium metasilicate, lauryl sulfate, propylene carbonate, and mixtures of these chemicals. In a preferred embodiment, the method further includes the addition of a caustic material such as sodium hydroxide at the pulping stage which enhances wax separation from the fiber.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is a table summarizing the characteristics of pulp treated with agglomeration chemicals and conditions according to the method of the invention;

FIG. 4 is a table summarizing the basis weight and caliper of handsheets formed from pulp treated with agglomeration chemicals and conditions according to the method of the invention;

FIG. 5 is a table summarizing the density, SSC, SSC Index, moisture, Canadian Standard Freeness (CSF), and percent VFS rejects for handsheets formed from pulp treated with agglomeration chemicals and conditions according to the method of the invention;

FIG. 6 is a table summarizing the accepted wax extraction, percent total pulp wax extraction, wax lost, conductivity, pH before pulping, and surface tension before pulping for pulp furnishes treated with agglomeration chemicals and conditions according to the method of the invention;

DETAILED DESCRIPTION OF THE PREFERRED EMBODIMENT

The present invention provides a method for removing wax from a pulp furnish that includes waxed old corrugated containers (wOCC). In the method, wax is separated from wax saturated OCC and then agglomerated and removed from the pulp furnish. The method provides a pulp furnish having an acceptably low wax content, preferably less than about 0.5% by weight based on the total weight of fibers.

In the method, agglomeration chemicals are added to a pulp furnish that includes waxed OCC. In one embodiment, the agglomeration chemicals are added to the furnish in the pulper. In another embodiment, the agglomeration chemicals are added to the furnish after pulping and before transfer to the pulper dump chest. In a preferred embodiment, the pulper furnish further includes a caustic material. Suitable caustic materials include soda ash and hydroxides such as ammonium, potassium, and sodium hydroxides. Preferably, the caustic material is sodium hydroxide.

Figure 1:
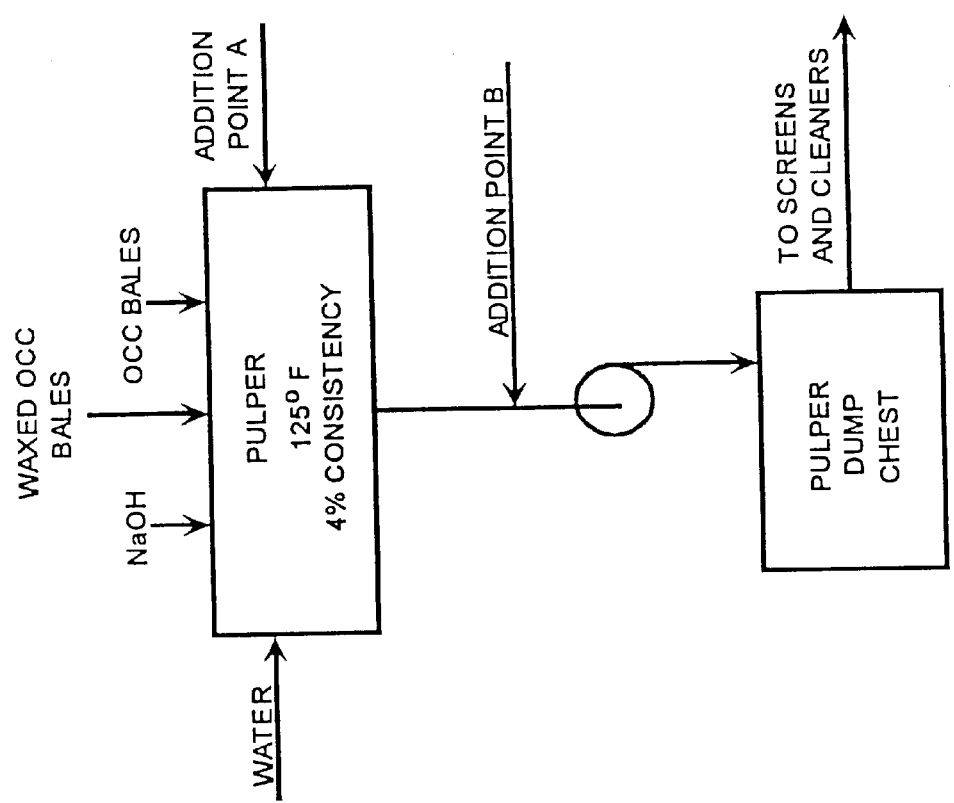
FIG. 1 is a flow diagram illustrating a representative method of the invention.

A representative method for removing wax from waxed OCC is illustrated by the flow diagram shown in FIG. 1. Referring to FIG. 1, waxed OCC and OCC bales are added to a pulper to provide a furnish having a consistency of about four percent by weight solids in water. Consistencies in the range from about 3 to about 8 percent by weight are suitable. The furnish is typically heated at a temperature of about 125° F. Suitable temperatures are generally in the range from about 120° F. to about 150° F. However, the temperature should not be so high as to melt the wax. For methods of the invention that utilize a caustic material to enhance wax removal, the caustic material is preferably added to the pulper prior to commencement of agitation. The agglomeration chemicals can be added to the furnish in the pulper (addition point A) prior to pulping or downstream from the pulper (addition point B) after pulping and prior to the furnish reaching the pulper dump chest. The optimal addition point will depend on the particular agglomeration chemical utilized and the OCC plant configuration. After treatment with the agglomeration chemical, the pulp furnish is directed to screens and cleaners where the agglomerated wax particles are removed from the furnish.

Suitable agglomeration chemicals include chemical additives that effect wax removal and agglomeration from waxed OCC in a pulp furnish. Specific agglomeration chemicals include sulfates, such as sodium sulfate, potassium sulfate, and lauryl sulfate; silicates and metasilicates, such as sodium silicate and sodium metasilicate; citrus oils, such as d-limonene; propylene carbonate; and mixtures of these chemicals. Preferred agglomeration chemicals include sodium sulfate, sodium metasilicate, and d-limonene. The combination of sodium metasilicate and d-limonene is a preferred agglomeration chemical combination.

The method of the present invention provides for the effective removal of wax from a pulp furnish. The method is equally suited for the removal of stickies. The term "stickies" refers to materials including adhesives, glues, and waxes commonly used in conjunction with paper and which present a problem during their recycling.

The following examples are presented for the purpose of illustration, and not limitation, of the present invention.

EXAMPLES

Example 1

Wax Removal From wOCC: Initial Agglomeration Chemical Results

In this example, the ability of agglomeration chemicals to remove wax from waxed OCC was determined. The pulp furnish included 10% by weight waxed OCC and 90% by weight OCC. The furnish was selected to simulate the estimated mill raw material mix. The estimate is based on grocery store projections.

General Procedure. Batches of OCC were pulped in a laboratory scale pulper. For methods including sodium hydroxide, it was added directly to the pulper before agitation began. The agglomeration chemicals were added either before or after pulping. The wax was then removed from the fibers by screening and washing the pulp. Handsheets were prepared from the resulting "cleaned" pulp and the handsheets were evaluated for wax content and strength properties.

The ability of the process to de-fiber the containers was evaluated with the Valley Flat Screen (VFS) Rejects test. In the test, the material which cannot pass through a 6/1000" slotted screen is considered "rejects". The weight percent of rejected material indicates the ability of the process to break down the containers into fiber and wax.

Representative Pulping and Wax Removal Procedure

1. Place 30 g of waxed OCC pieces and 270 g of unwaxed OCC pieces (2"×2" maximum) in the small batch pulper.

2. Add 4700 ml of hot deionized water (DI) 52° C. (125° F.) to the pulper to obtain a 6% pulper consistency.

3. For the caustic sets, add 12 grams of 50% NaOH (2% NaOH by weight).

4. For sets with agglomeration chemicals added before pulping, add 0.75 gram of the as received chemical at an addition rate of 5 pounds chemical/ton fiber.

5. Run pulper for 30 seconds to obtain mixing. For each batch of pulp, run pulper for another 45 minutes. Insulate pulper to maintain pulp temperature.

6. Remove 50 grams of OD fiber (on an oven dry basis) from each batch for rejects test.

7. Dilute each batch to 1% consistency with hot water (52° C.).

8. Run Valley Flat Screen Rejects test with 6/1000 inch cut slots using hot water (about 50° C.) for the rinse water.

9. Remove another 100 grams of OD fiber from each batch.

10. Repeat steps 7 and 8.

11. Dilute the accept pulp to 1.0% consistency for sheet formation. Adjust to pH 7.0. Prepare ten standard handsheets (basis weight 26 lb/MSF, i.e., 26 lb/1000ft$^2$) from the accepts with pressing at 50 psi.

12. Prepare two handsheets from the unscreened pulp for wax testing.

The following agglomeration chemicals were utilized in the above described procedure as indicated.

| Identifier | Chemical |
|---|---|
| SAF42-1 | Control |
| SAF42-2 | 2% NaOH |
| The following examples included 2% NaOH added before pulping. | |
| SAF42-3 | Potassium sulfate before pulping |
| SAF42-4 | Potassium sulfate after pulping |
| SAF42-5 | Cytec 3523 before pulping |
| SAF42-6 | Lauryl sulfate before pulping |
| SAF42-7 | 2-propanol after pulping |
| SAF42-8 | Lauryl sulfate before pulping and 2-propanol after pulping |
| SAF42-9 | Potassium sulfate before and citric acid after pulping |

-continued

| Identifier | Chemical |
| --- | --- |
| SAF42-10 | Citric acid after pulping |
| SAF42-11 | MURPHY'S OIL SOAP and Cytec 3523 both before pulping |
| SAF42-12 | Lauryl sulfate before and potassium sulfate after pulping |
| SAF42-13 | Sodium metasilicate before pulping |
| SAF42-14 | SIMPLE GREEN before pulping |
| SAF42-15 | Sodium metasilicate before and potassium sulfate after pulping |
| SAF42-16 | Potassium sulfate before and 2-propanol after pulping |
| SAF42-17 | Sodium sulfate before pulping |
| SAF42-18 | d-Limonene before pulping |
| SAF42-19 | Sodium metasilicate (5 lbs/ton) and Darasperse 2372 (1 lb/ton) both added before pulping. |
| SAF42-20 | Sodium lignosulfonate before pulping |
| SAF42-21 | Terpineol before pulping |
| SAF42-26 | PAC (polyaluminum chloride) |
| | The following examples did not include sodium hydroxide. |
| SAF42-22 | Potassium sulfate before pulping |
| SAF42-23 | Potassium sulfate after pulping |
| SAF42-24 | Sodium metasilicate |
| SAF42-25 | SIMPLE GREEN |
| SAF42-27 | NaOH to pH 8–8.5 |
| SAF42-28 | NaOH to pH 8–8.5 and potassium sulfate |

In addition to the agglomeration chemicals identified above, other agglomeration chemicals (i.e., SAF41-15 through SAF41-42) evaluated in the procedure include those in FIG. 2. The visual appearance, VFS rejects, reject ranking, accepted wax extraction percentage, and total wax extraction for these chemicals are summarized in FIG. 2. In the FIGURES, the agglomeration chemicals are referred without their SAF41 or SAF42 prefix.

Figure 3:
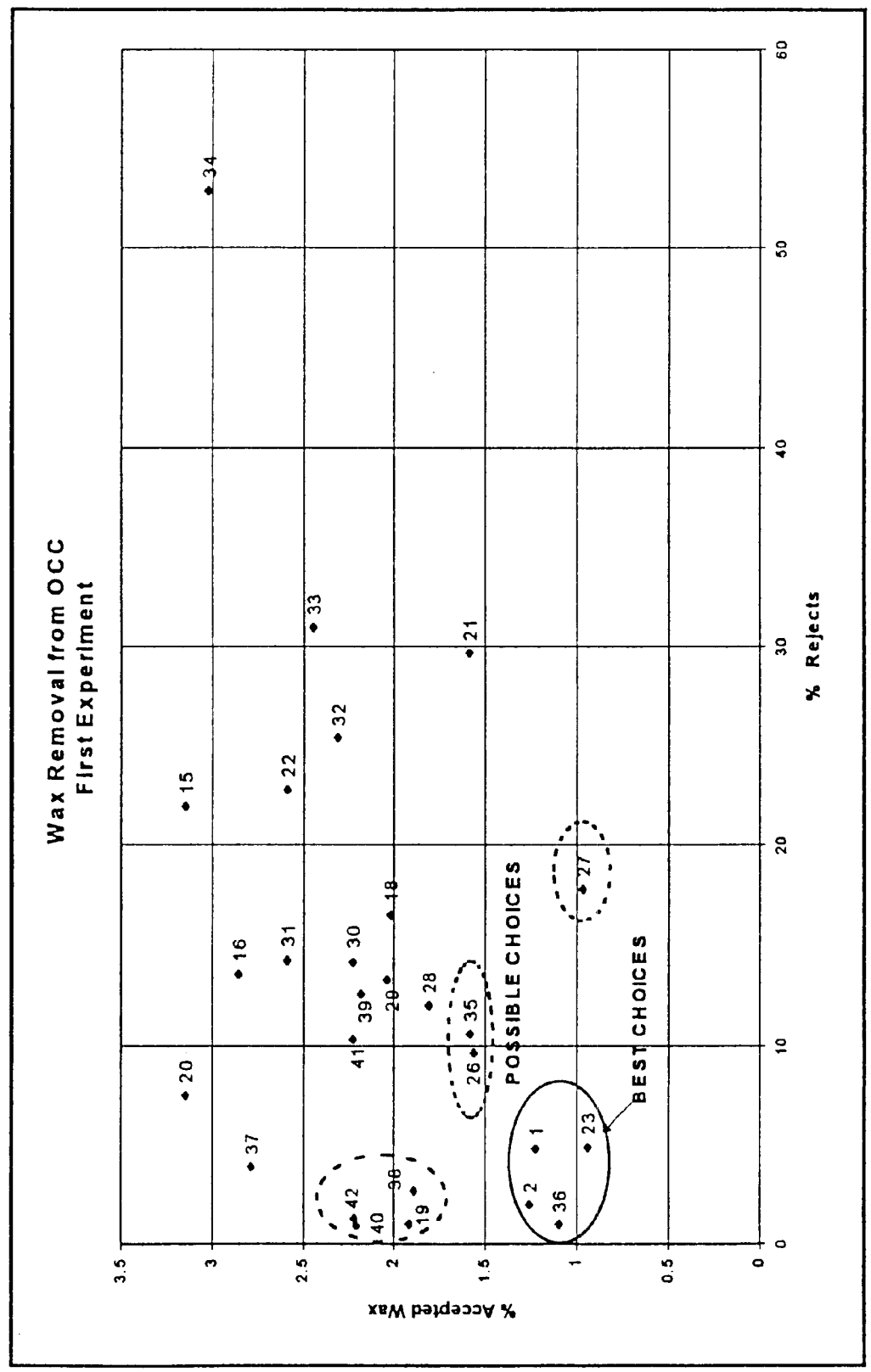
FIG. 3 is a graph illustrating wax removal from a pulp furnish containing Waxed OCC according to the method of the invention.

Initial Results. With the selected furnish ratio of 10:90 by weight waxed:unwaxed OCC, the raw material for this experiment contained 3% by weight wax. Several of the chemical processes were able to reduce the wax to 1.5% or less and have defiber-to-rejects of 10% or less. The results of the wax and rejects evaluation for the above-noted agglomeration chemical additions are presented graphically in FIG. 3. In FIG. 3, wax removal is illustrated by plotting percent accepted wax versus percent rejects.

Referring to FIG. 3, many of the chemistry formulations were able to defiber the raw material as evidenced by reject rates less than 10%. None of the chemistries were able to reach the wax content target of 0.5%. The results indicate that preferred agglomeration chemicals and conditions include 2% NaOH with Cytec's polyacrylamide 3523 (23), 2% NaOH with lauryl sulfate (36), 2% NaOH with sodium metasilicate (40), 2% NaOH with SIMPLE GREEN (42), 2% NaOH with potassium sulfate (19), 2% NaOH with MURPHY'S OIL SOAP (38), 2% NaOH with 1-octanol (26), 2% NaOH with citric acid (35), and 2% NaOH with 2-propanol (27).

In addition to the agglomeration chemicals noted above, inert materials were also evaluated for their ability to agglomerate wax. The materials included calcium carbonate, clay, talc, ammonium zirconium carbonate, diatomaceous earth (silicate remains of plankton), and sodium borate. These materials were ineffective at reducing the wax content in the cleaned pulp and, in some cases, created more rejects.

Example 2

Strength of Handsheets Formed from Pulp Furnishes Containing wOCC

In this example, the sheet strength of handsheets formed from pulp furnishes treated by the method of the invention was determined. In addition to evaluating the ability of agglomeration chemicals to remove wax from a pulp furnish containing waxed, the short span compression strength (SSC) was determined. The short span compression strength (SSC) was determined using TAPPI Method T826. The SSC Index is calculated as the SSC in lb/inch divided by the basis weight in lb/MSF and thus is normalized for basis weight. The pulp furnish included 10% by weight waxed OCC and 90% by weight OCC. As described below, the method of the invention provides handsheets having high sheet strength with low rejects and low wax content.

Figure 7:
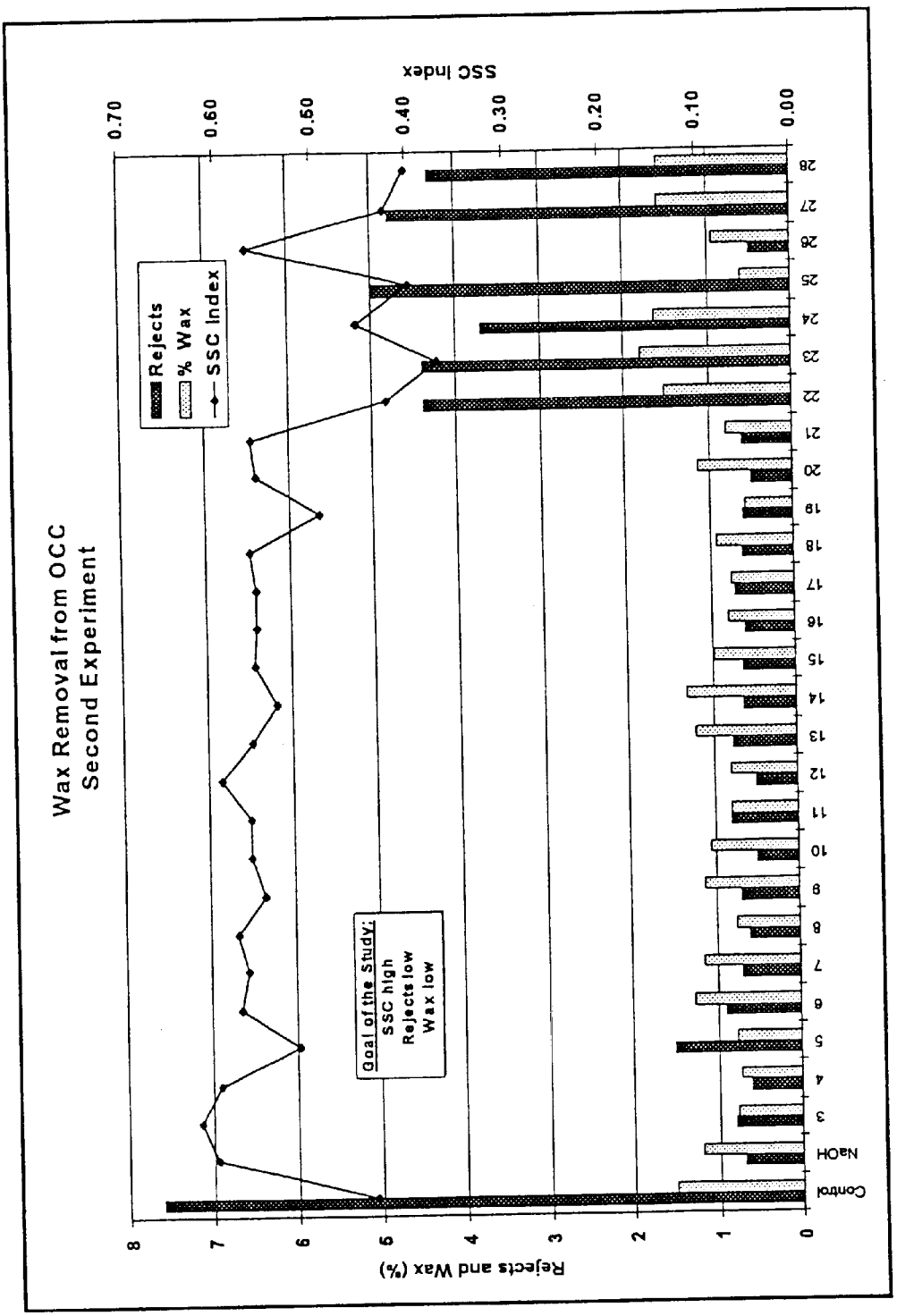
FIG. 7 is a graph illustrating wax removal, percent rejects and wax, and SSC Index for handsheets formed from pulp furnishes treated according to the method of the invention.

The basis weight and caliper for handsheets prepared from pulp furnishes treated using agglomeration chemicals and conditions as described above in Example 1 are summarized in FIG. 4. The density, SSC, SSC Index, moisture, Canadian Standard Freeness (CSF), and percent VFS rejects for these handsheets are summarized in FIG. 5. FIG. 6 summarizes the accepted wax extraction, percent total pulp wax extraction, wax lost, conductivity, pH before pulping, and surface tension before pulping for the identified pulp furnishes. FIG. 7 shows the impact of the chemical additions on the rejects, wax, and short span compression strength (SSC).

Referring to FIG. 7, sets 2 through 21 and 26 all contained 2% sodium hydroxide in the pulping stage. Sets 27 and 28 included only enough sodium hydroxide to elevate the pH to 8.5 (about 0.5% sodium hydroxide is required to obtain pH 8.5). Sets 1 and 22 to 25 did not contain any sodium hydroxide. As illustrated in FIG. 7, the addition of sodium hydroxide is required to reduce the rejects to an acceptable level in the process.

Agglomeration chemistries that do not achieve a short span compression strength index of 0.5 or greater are not preferred. All of the chemistries evaluated provided reject rates below typical industry reject rates of 8 to 10%. Preferred chemistries provide handsheets having a final sheet wax content of less than 1% by weight.

Regarding certain of the agglomeration chemicals, the Daraclean product is comprised of 85% d-limonene and other organic components. The major component of SIMPLE GREEN is oil of bitter orange which contains d-limonene, citral, terpineol and pinene. A major component of both is d-limonene, a preferred agglomeration chemical.

Figure 8:
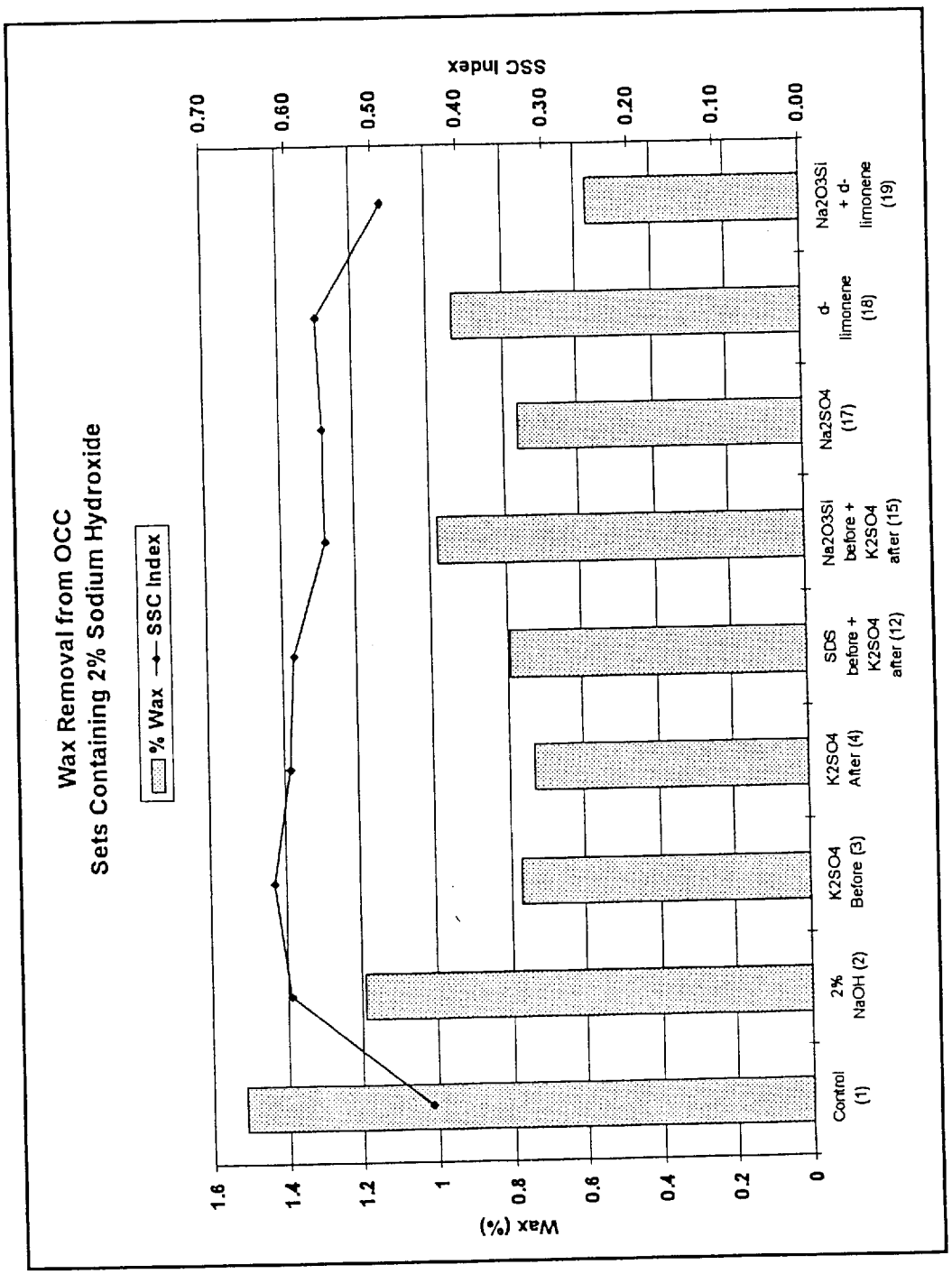
FIG. 8 is a graph illustrating wax removal and SSC Index for handsheets formed from pulp furnishes treated with sodium hydroxide and representative agglomeration chemicals according to the method of the invention.

Preferred agglomeration chemicals and their wax removal characteristics are illustrated in FIG. 8. Preferred agglomeration chemicals include potassium sulfate ($K_2SO_4$), sodium sulfate ($Na_2SO_4$), lauryl sulfate (sodium dodecyl sulfate or SDS), d-limonene, and sodium metasilicate ($Na_2O_3Si$).

Some mills are not equipped to run sodium hydroxide in the pulping operation. However, mills that are not equipped to utilize sodium hydroxide benefit from the addition of agglomeration chemicals to the pulper. The results for removing wax from a pulp furnish without using sodium hydroxide according to the method of the present invention is illustrated in FIG. 9.

None of the chemicals shown in FIG. 9 achieve a reject level as advantageous as the sodium hydroxide-containing chemistry schemes, however, all are below the industry target of 8% rejects.

Figure 9:
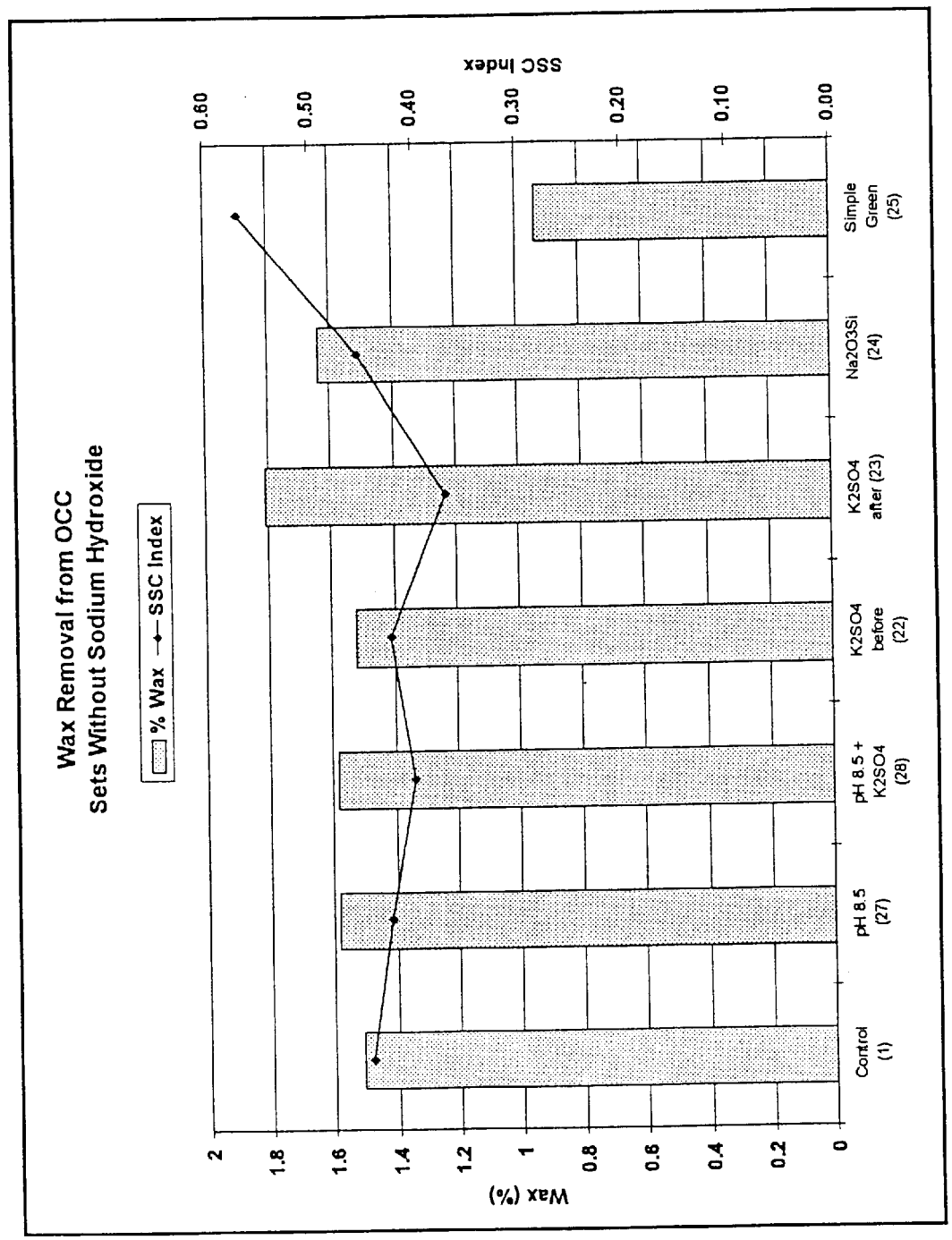
FIG. 9 is a graph illustrating wax removal and SSC Index for handsheets formed from pulp furnishes treated representative agglomeration chemicals and not treated with sodium hydroxide according to the method of the invention.

Most of the chemistries depicted in FIG. 9 provide handsheets that contain as much wax as the control. The addition of SIMPLE GREEN (commercial household cleaner) to the pulper does reduce the wax to less than 1%. Because the major component of SIMPLE GREEN is d-limonene, the addition of d-limonene to the pulper in a mill not set up for sodium hydroxide provides an alternative for that mill for reducing wax content. Furthermore, as illustrated in FIG. 9, the addition of SIMPLE GREEN increased the strength of the handsheet.

Example 3

Wax Removal From wOCC: d-Limonene and Sodium Metasilicate

In this example, the ability of the combination of d-limonene and sodium metasilicate to remove wax from waxed OCC was determined. The pulp furnish included 10% by weight waxed OCC and 90% by weight OCC.

Figure 10:
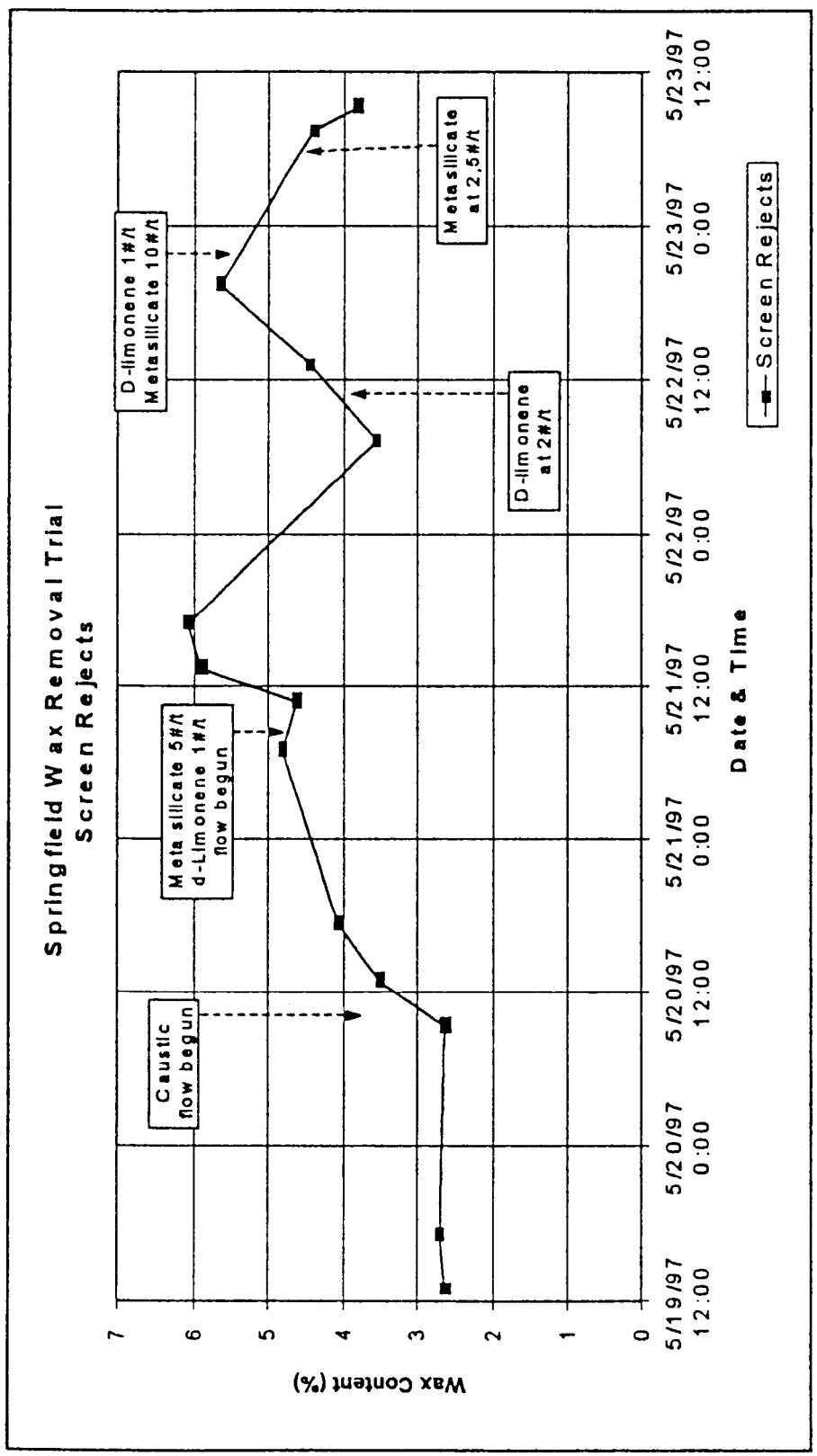
FIG. 10 illustrates the wax content profile for screen rejects during the course of wax removal according to the method of the present invention.
Figure 11:
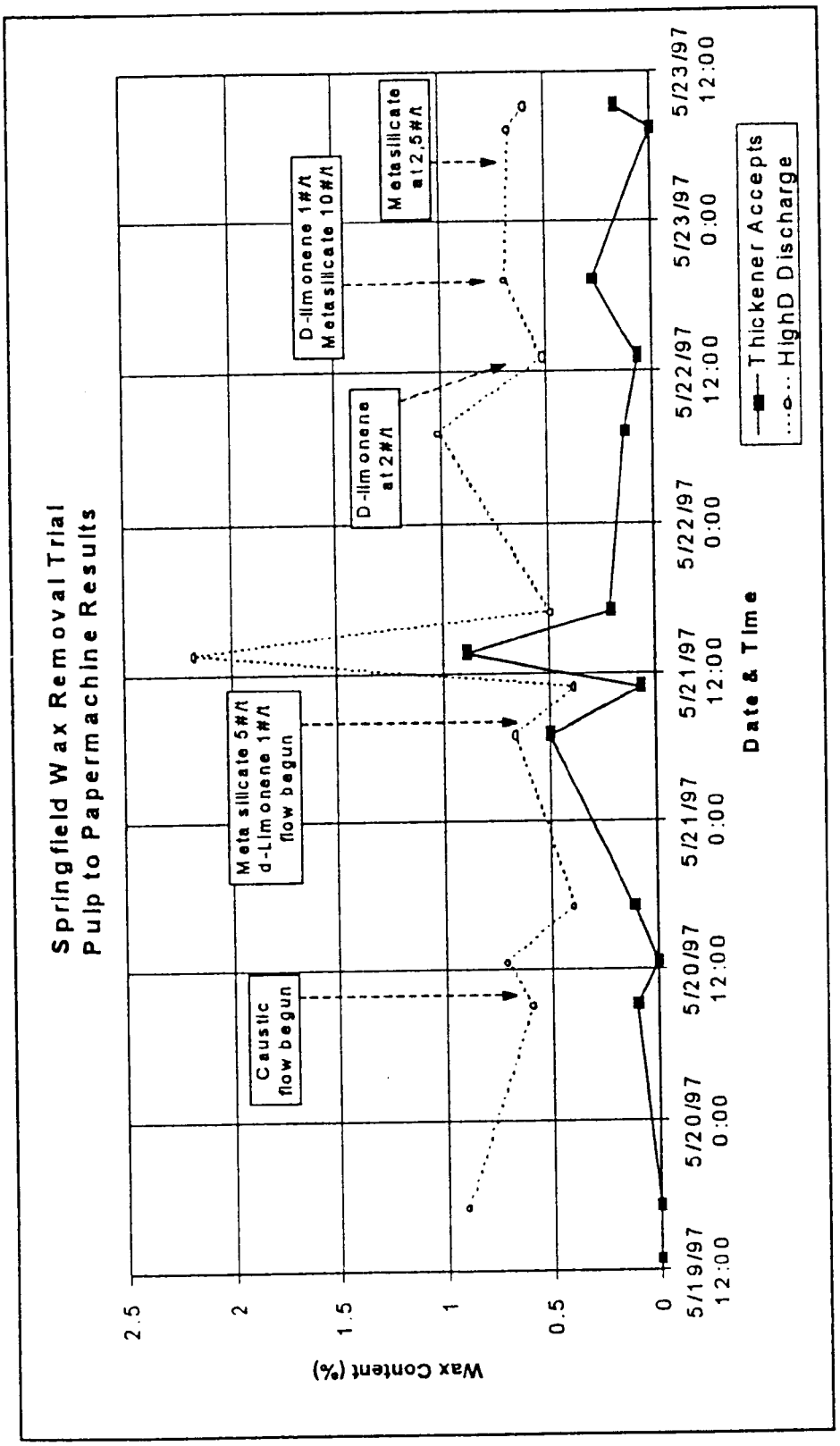
FIG. 11 illustrates the wax content profile for thickener accepts and high density discharge during the course of wax removal according to the method of the present invention.

The fine screens were able to concentrate the wax by removing it with the rejects. The wax content of the fine screen rejects increased with the addition of caustic (i.e., sodium hydroxide) as shown in FIG. 10. The addition of d-limonene and sodium metasilicate also increased the removal of wax in the fine screen rejects. The high variability in the wax content appears to be partially due to variability of the wax in the pulper accepts. The wax variability also appears in the thickener accepts and the high density storage discharge as seen in FIG. 11.

Figure 12:
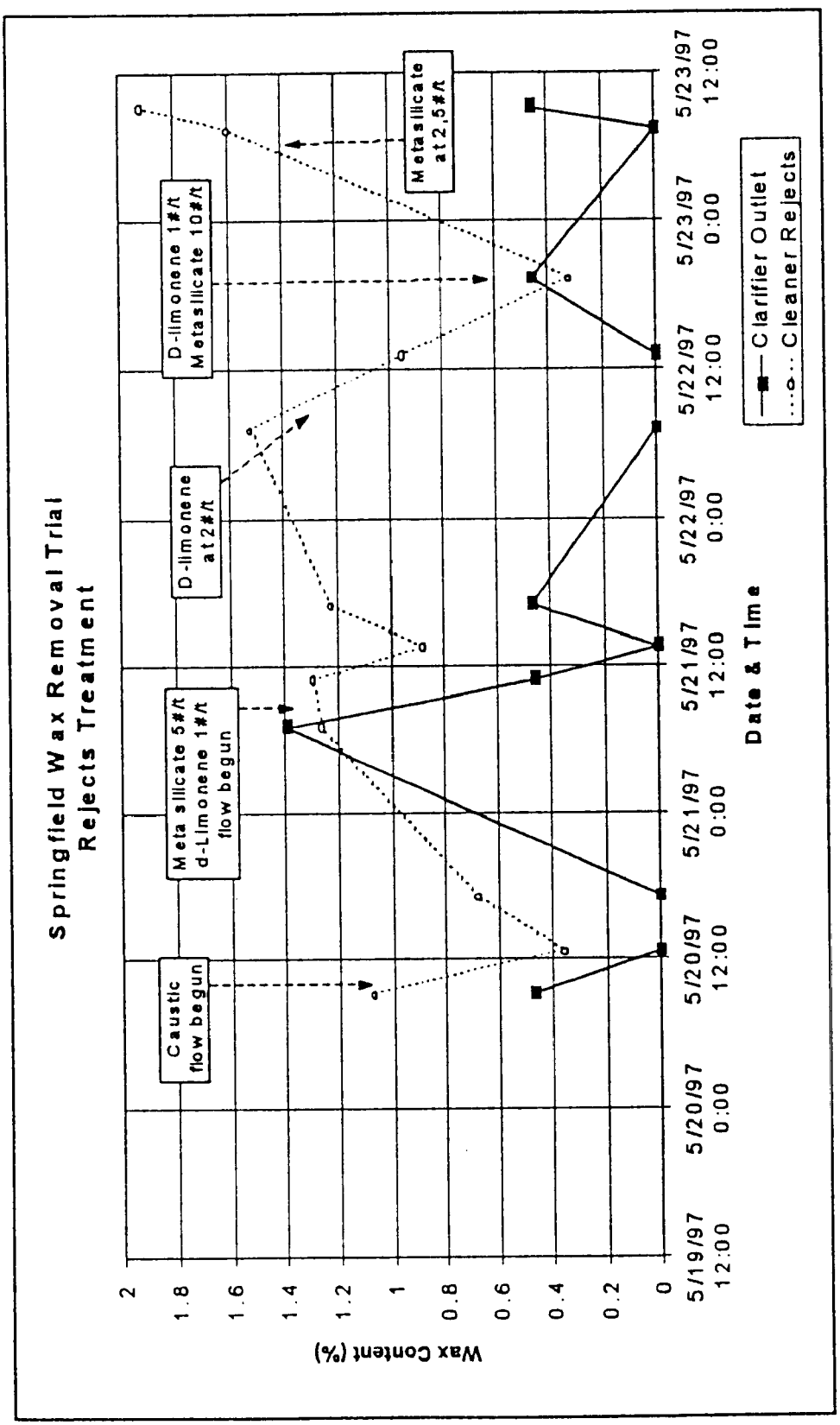
FIG. 12 illustrates the wax content profile for the clarifier outlet and cleaner rejects during the course of wax removal according to the method of the present invention.

There were concerns that the wax removed in the cleaners would be returned to the system via the clarifier. As illustrated in FIG. 12, the clarifier is capable of removing the wax from the cleaner rejects. The cleaner rejects wax content was higher when the d-limonene and metasilicate were added.

Figure 13:
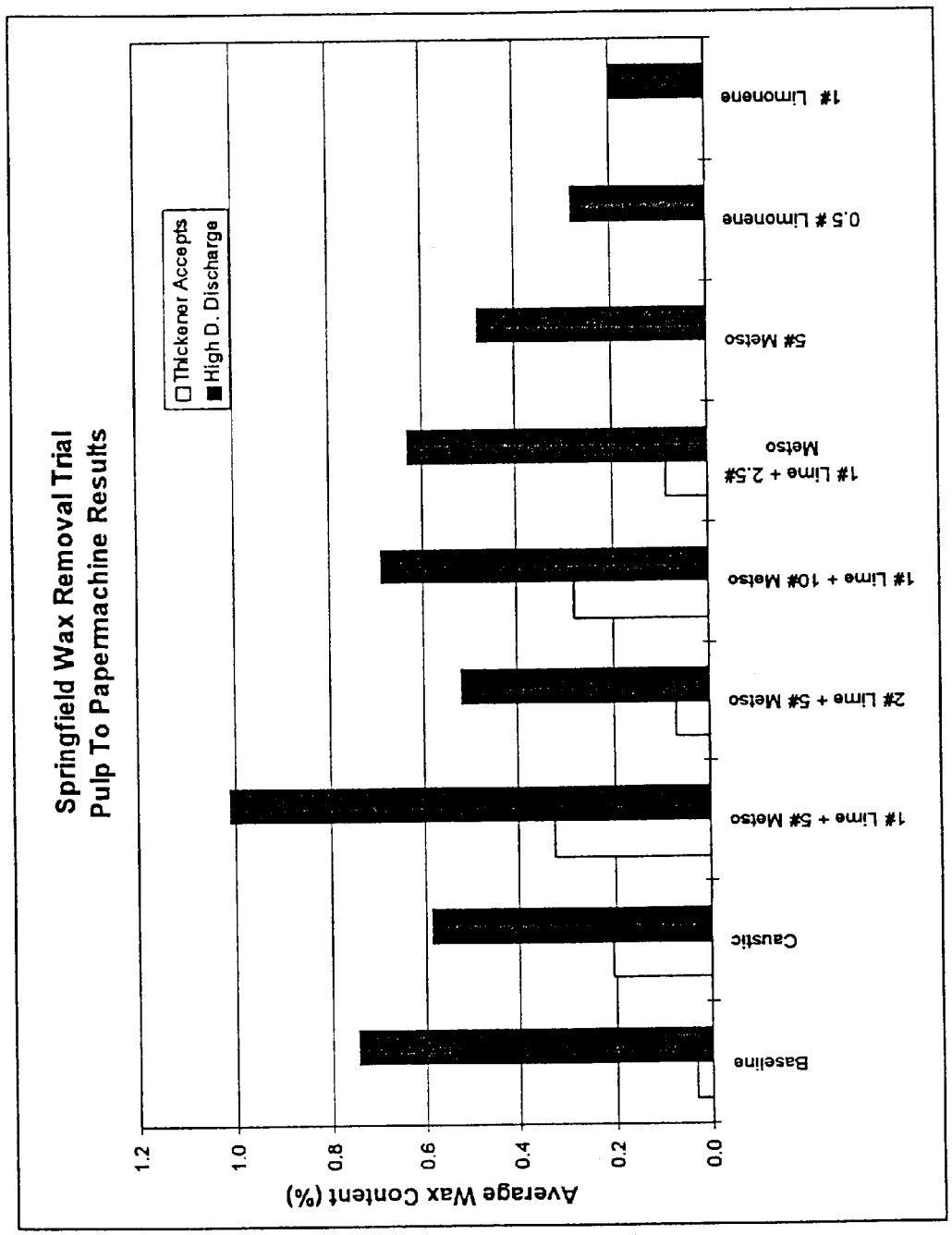
FIG. 13 is a graph illustrating average wax content in thickener accepts and high density discharge with representative agglomeration chemicals according to the method of the invention.

FIG. 13 shows the average wax content of the thickener and the high density storage discharges during the trial. All of the pulps contained caustic, except for the baseline pulp. The wax content of the high density storage did decrease with the addition of caustic. The lowest wax content occurred with the addition of 1 lb/ton of d-limonene and caustic.

Figure 14:
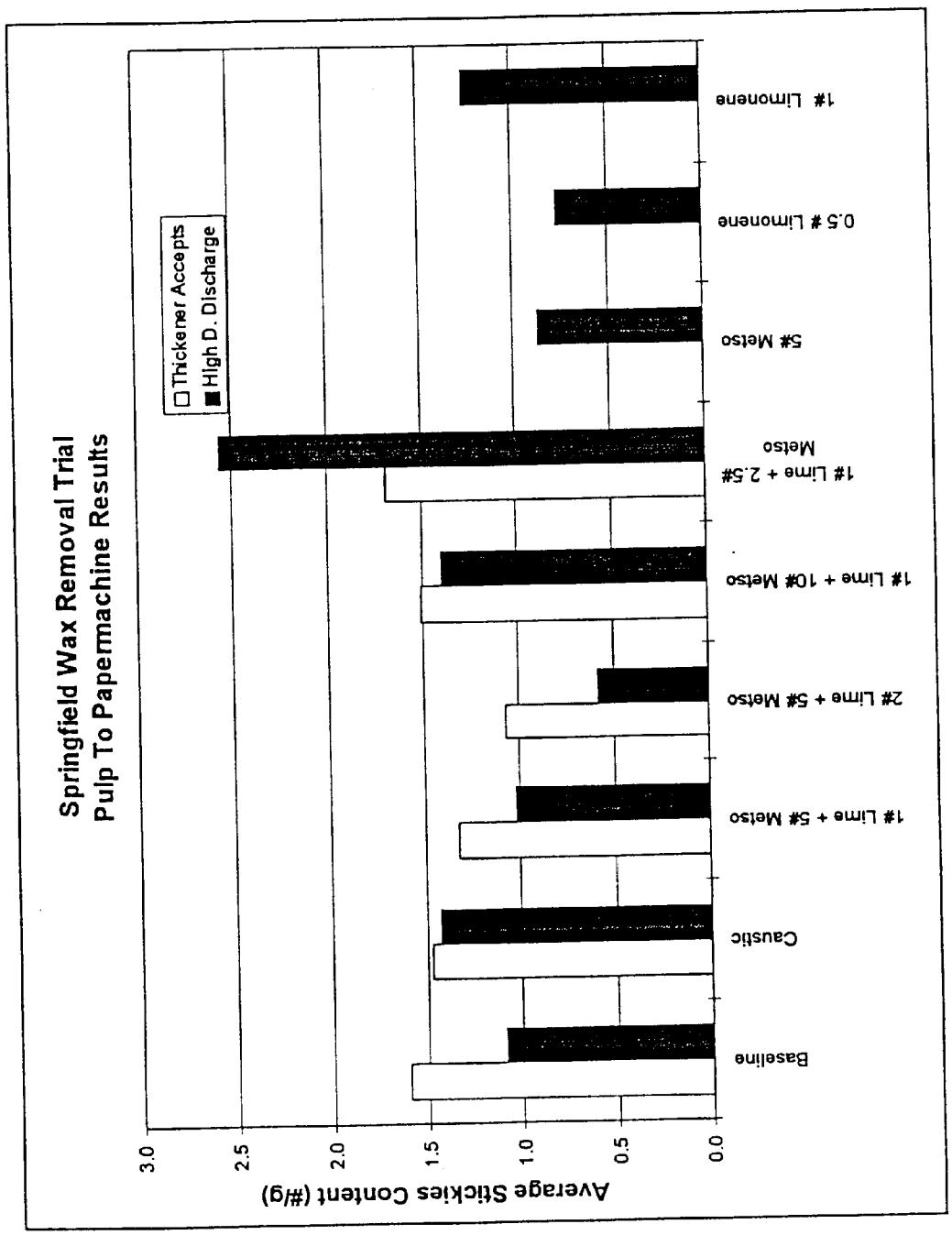
FIG. 14 is a graph illustrating average stickies content in thickener accepts and high density discharge with representative agglomeration chemicals according to the method of the invention.

The stickies count of the pulp samples are shown in FIG. 14. The addition of caustic reduced the stickies count slightly. The addition of d-limonene and sodium metasilicate was successful in reducing the stickies of the high density discharge pulp. A preferred combination for producing low stickies counts is caustic (e.g., sodium hydroxide) with d-limonene (2 lb/ton) and sodium metasilicate (5 lb/ton).

Figure 15:
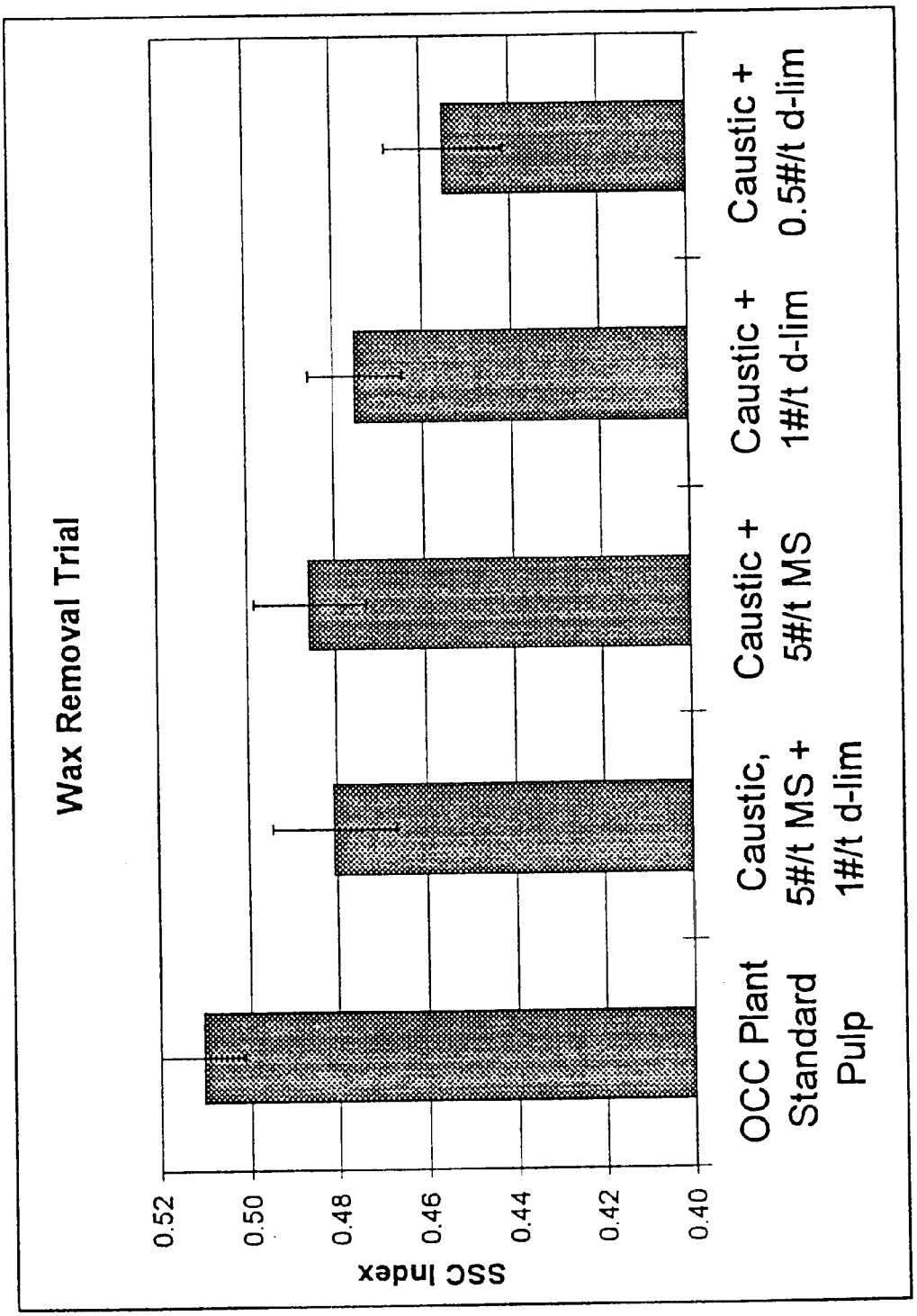
FIG. 15 is a graph illustrating SSC Index for handsheets formed from pulp furnishes treated with representative agglomeration chemicals according to the method of the invention.

The addition of d-limonene and sodium metasilicate lowers the strength of handsheets formed from the pulp as shown in FIG. 15.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method for removing wax from a pulp furnish, comprising:
    adding an agglomeration chemical combination comprising d-limonene and sodium metasilicate to a pulp furnish comprising fibers and wax, wherein the agglomeration chemical combination is added in an amount effective to separate wax from the fibers to provide a resulting furnish comprising wax particles and fibers substantially free from wax, wherein the pulp furnish is maintained at a temperature below the wax melting point; and
    screening the resulting furnish to separate the wax particles to provide a pulp furnish substantially free from wax.

2. The method of claim 1 wherein the pulp furnish has a wax content of about 3 percent by weight based on the total weight of fibers.

3. The method of claim 1 wherein the pulp furnish substantially free from wax is suitable for a papermaking machine.

4. The method of claim 1 wherein pulp furnish substantially free from wax has a wax content less than about 0.5 percent by weight based on the total weight of fibers.

5. The method of claim 1 wherein the agglomeration chemical combination is added to the pulp furnish prior to or during pulping.

6. The method of claim 1 wherein the agglomeration chemical combination is added to the pulp furnish after pulping.

7. The method of claim 1 wherein the agglomeration chemical combination further comprises at least one of sodium sulfate, potassium sulfate, laurel sulfate, sodium silicate, and propylene carbonate.

8. The method of claim 1 wherein the agglomeration chemical combination comprises sodium sulfate.

9. A method for removing wax from a pulp furnish, comprising:
    adding an agglomeration chemical combination comprising d-limonene and sodium metasilicate to a pulp furnish comprising a caustic material, fibers and wax, wherein the agglomeration chemical combination is added in an amount effective to separate wax from the fibers to provide a resulting furnish comprising wax particles and fibers substantially free from wax, wherein the pulp furnish is maintained at a temperature below the wax melting point; and
    screening the resulting furnish to separate the wax particles to provide a pulp furnish substantially free from wax.

10. The method of claim 9 wherein the caustic material comprises sodium hydroxide.

11. The method of claim 9 wherein the pulp furnish has a wax content of about 3 percent by weight based on the total weight of fibers.

12. The method of claim 9 wherein the pulp furnish substantially free from wax is suitable for a papermaking machine.

13. The method of claim 9 wherein pulp furnish substantially free from wax has a wax content less than about 0.5 percent by weight based on the total weight of fibers.

14. The method of claim 9 wherein the agglomeration chemical combination is added to the pulp furnish prior to or during pulping.

15. The method of claim 9 wherein the agglomeration chemical combination is added to the pulp furnish after pulping.

16. The method of claim 9 wherein the agglomeration chemical combination further comprises at least one of sodium sulfate, potassium sulfate, laurel sulfate, sodium silicate, and propylene carbonate.

17. The method of claim 9 wherein the agglomeration chemical combination comprises sodium sulfate.

* * * * *